United States Patent [19]

Ross

[11] 4,151,589
[45] Apr. 24, 1979

[54] DECOUPLED CASCADE CONTROL SYSTEM

[75] Inventor: Charles W. Ross, Hatboro, Pa.

[73] Assignee: Leeds & Northrup Company, North Wales, Pa.

[21] Appl. No.: 874,974

[22] Filed: Feb. 3, 1978

[51] Int. Cl.² .................................................. G05B 17/02
[52] U.S. Cl. ..................................... 364/106; 318/561; 364/108; 364/116; 364/118
[58] Field of Search ............... 364/105, 106, 108, 114, 364/116, 118, 500; 318/561

[56] References Cited

U.S. PATENT DOCUMENTS

| | | | |
|---|---|---|---|
| 3,221,230 | 11/1965 | Osburn | 364/106 X |
| 3,657,524 | 4/1972 | Bakke | 364/118 X |
| 3,758,762 | 9/1973 | Littman et al. | 364/116 |
| 3,795,799 | 3/1974 | Courtiol | 364/106 |
| 4,054,780 | 10/1977 | Bartley et al. | 364/106 |

OTHER PUBLICATIONS

Liptack, "Cascade Control" – *Instrument Engineers Handbook*, vol. II, Chilton Book Co., New York, pp. 819–825.

*Primary Examiner*—Joseph F. Ruggiero
*Attorney, Agent, or Firm*—William G. Miller, Jr.; Raymond F. MacKay

[57] ABSTRACT

Two controllers in a cascade control system are decoupled to avoid interaction by modifying the error signal to the primary controller in response to changes in the error signal to the secondary controller. The response is developed by a network which models the primary process. A signal developed from the output of the primary controller is fed forward to modify the manipulated variable. The modifying network is a model of the reciprocal of the dynamics of the secondary process. Also, the adjustment performed by the primary controller on the set point of the secondary controller is delayed in accordance with the product of the secondary process model and the reciprocal feedforward model.

5 Claims, 4 Drawing Figures

DECOUPLED CASCADE CONTROL SYSTEM

BACKGROUND OF THE INVENTION

This invention relates to cascade control systems. In the control of some processes it is possible to utilize an intermediate process variable that responds to both the manipulated variable and to some disturbances to provide a secondary control to achieve more effective control over the primary process variable. This technique is called "cascade control". Cascade control is essentially the use of the output of a primary controller to adjust the set point of a secondary controller.

In utilizing cascade control, frequently the dynamics of the secondary process which produces the intermediate variable are not considerably faster than those of the primary process, so that the advantages of cascade control are reduced in that the intermediate variable, which will hereafter be called the secondary variable, cannot be corrected by the secondary controller before a pronounced influence is felt by the primary variable. Also, the advantages are reduced if the secondary controller must have a low gain and/or a high reset rate. In some systems attempts to tune both the primary and secondary controllers to give good response to the disturbances affecting both the primary and secondary processes may lead to oscillatory or unstable control. Some attempts have been made to avoid such results. For example, the system shown in FIG. 7.8e on page 824 of Volume II of Instrument Engineers Handbook by B. G. Liptack, published by Chilton Book Company, New York, shows a system wherein the secondary controlled variable is utilized not only as an input to the secondary controller but is also utilized as a reset input to the primary controller. Systems of this type will not provide the necessary decoupling of the primary and secondary control systems to avoid interaction as is desired.

It is an object of this invention to improve upon the cascade control systems used heretofore to overcome the interactions between the primary and secondary controllers by a novel method of decoupling.

SUMMARY OF THE INVENTION

This invention provides an improvement in cascade control systems wherein a primary process is controlled by a primary controller responding to a first error signal indicative of the deviation of a primary control variable from a first set point to modify a second set point, and a secondary process is controlled by a second controller responding to a second error signal indicative of the deviation of a secondary variable from said second set point. The improvement comprises a means responsive to the deviation of the secondary variable from said second set point for modifying the first error signal by an amount sufficient to reduce or cancel the effects on the first error signal resulting from changes in the primary variable due to disturbances affecting the secondary processes.

Further improvement is provided by utilizing means for modifying the manipulated variable in response to the control signal from the secondary controller with the response being in accordance with the inverse model of the dynamics of the secondary process with the addition of means for modifying the deviation of the secondary controlled variable in accordance with the product of an inverse model and a full model of the secondary process.

BRIEF DESCRIPTION OF THE DRAWINGS

In the drawings like reference characteristics refer to like elements.

DESCRIPTION OF THE PREFERRED EMBODIMENTS

Figure 1:
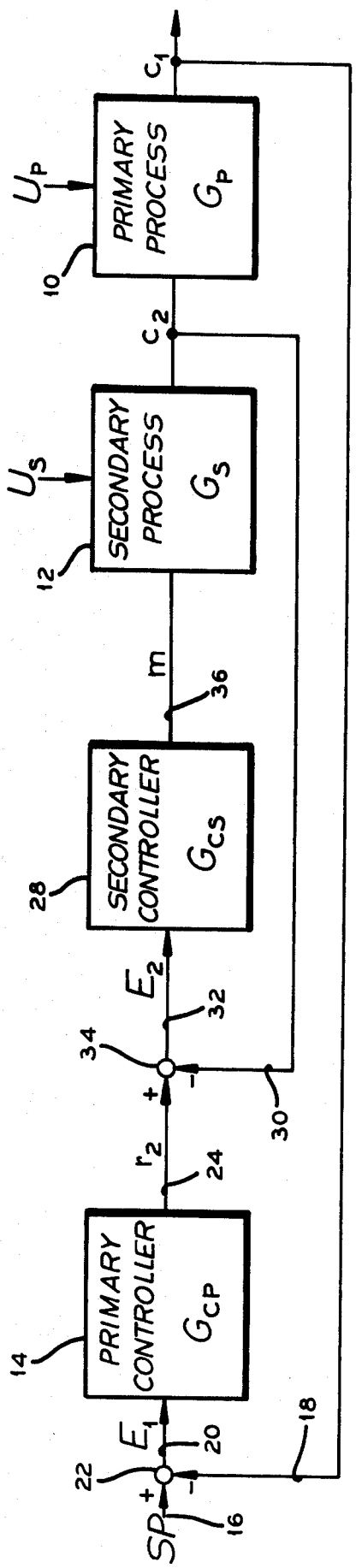
FIG. 1 is a block diagram of a conventional cascade control system.

With reference to FIG. 1 there is shown a block diagram of a conventional cascade control system wherein the process to be controlled has been divided into a primary process 10 having a transform $G_p$ and a secondary process 12, having a transform $G_s$ such that the primary controller 14 whose transform is shown as $G_{cp}$ is arranged for the control of the primary controlled variable $c_1$ to attempt to maintain that variable at its set point SP as established by the signal on line 16. The primary controller 14 responds to the deviation between $c_1$ as represented by the signal on line 18 and the signal SP as represented on line 16 to form the error $E_1$ as an input on line 20 from the summing junction 22. The primary controller 14 then produces at its output on line 24 a control signal $r_2$ which represents the set point for the secondary controller 28 whose transform is shown as $G_{cs}$.

The secondary controller 28 operates to maintain the secondary controlled variable $c_2$ on line 30 equal to the set point $r_2$ established on line 24 by responding to the error signal $E_2$ on line 32 as developed from the summing junction 34 which compares $c_2$ and $r_2$.

The secondary controller 28 produces as an output control signal "m" on line 36 which is effective to control the manipulated variable of that process which includes both the primary and secondary processes 10 and 12 of FIG. 1. As shown in FIG. 1, the secondary process is subject to disturbances which are represented by $U_s$ which affect only the secondary process directly. The primary process is likewise subjected to disturbances represented by $U_p$ which affect only the primary process.

Figure 2:
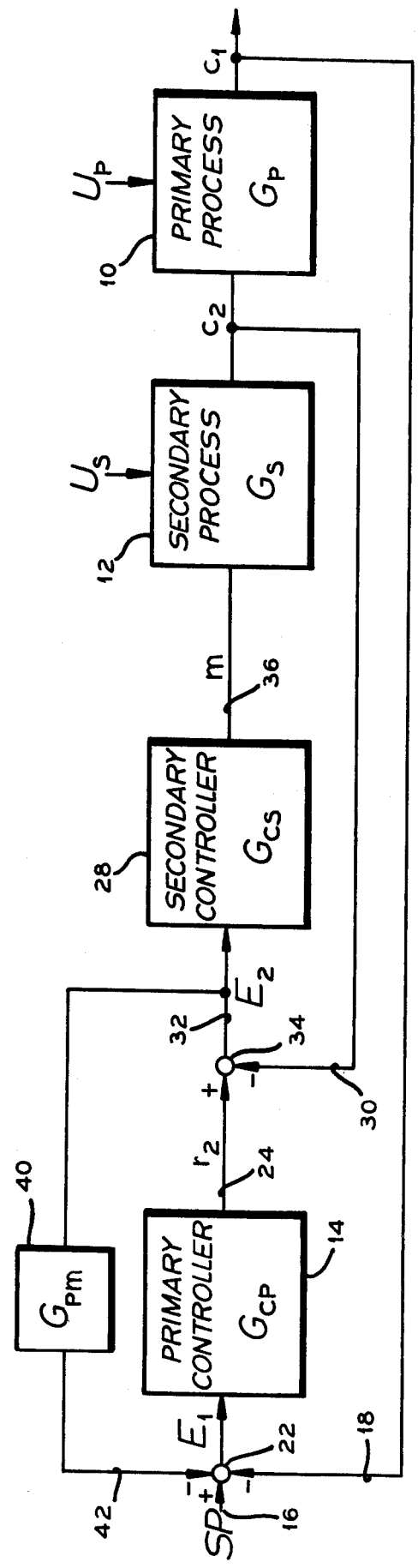
FIG. 2 is a block diagram of a cascade control system showing one improvement.

When the dynamics of the secondary process control loop which includes both the secondary process 12 and the secondary controller 28 is not considerably faster than the primary process control loop which includes the primary process 10 and the primary process controller 14, significant interactions will occur between the primary and secondary controllers as pointed out previously. When the disturbance to be compensated for is one which affects the secondary process 12 only, namely the disturbance $U_s$, it is desirable to have the secondary controller do the controlling and prevent, if possible, the action of the primary controller which will normally result when the primary variable $c_1$ changes in response to the disturbance. To prevent such interaction, the improvement shown in FIG. 2 is useful. It provides a circuit which represents a model of the primary process whose transform $G_{pm}$ is represented by a circuit inserted in the system as shown by block 40. The model causes $E_1$ to respond to changes in error signal $E_2$ by providing an input on line 42 to summing junction 22 to modify the deviation between the set point SP and the primary control variable $c_1$.

If the circuit 40 is an accurate model of the primary process, the input it provides on line 42 will just compensate for the changes in input from line 18 to that summing junction as a result of the disturbance to the secondary process. There is thus prevented any action by the primary controller 14 in response to the disturbance and the entire control action is taken by the secondary controller 28.

Figure 3:
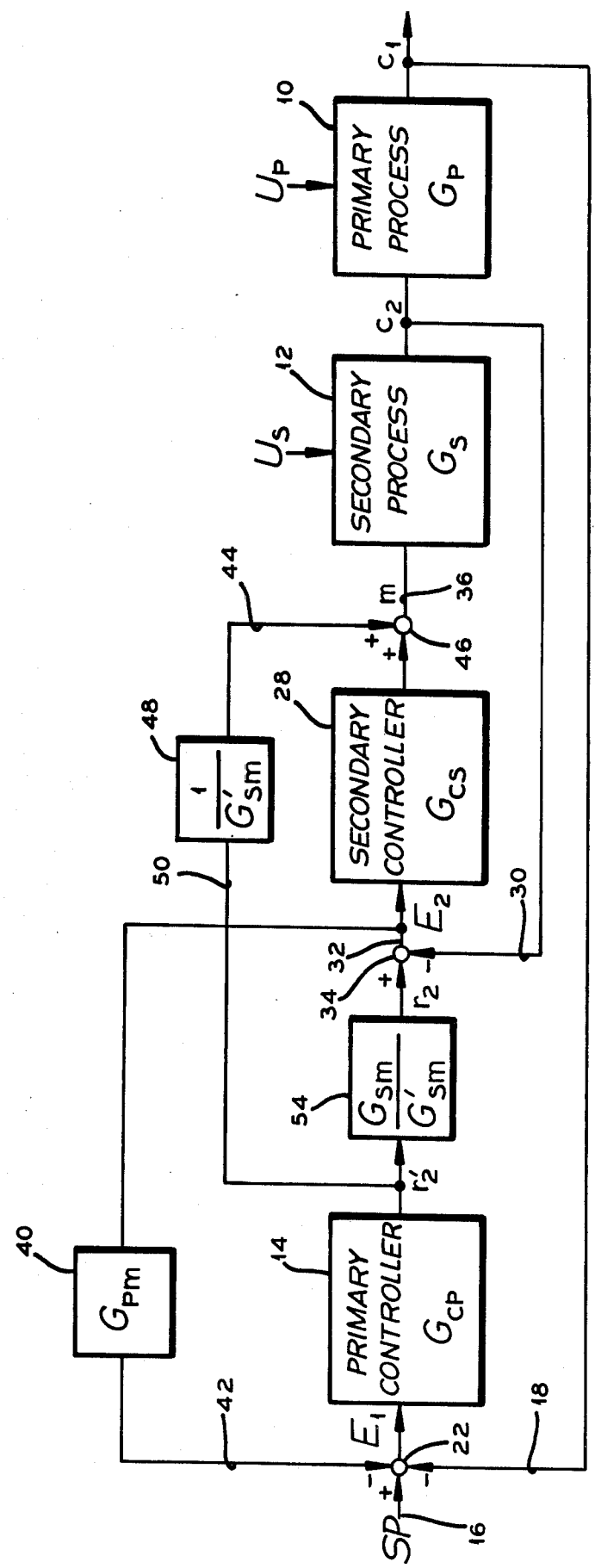
FIG. 3 is a block diagram of a cascade control system showing additional improvements added to the improvement of FIG. 2.

When disturbances $U_p$ occur which affect only the primary process or when there is a change in set point SP, it is desirable to add to the system shown in FIG. 2 further improvements as shown in FIG. 3 to decouple the secondary controller in avoidance of response by the secondary controller to disturbances which should advantageously be controlled by the primary controller, these further improvements include the feedforward signal on line 44 which sums with the output of the secondary controller at summing junction 46 to modify the value of the manipulated variable on line 36. The signal on line 44 is produced by the modeling network shown as block 48 which has as its input on line 50 the signal from the output of the primary controller 14 shown as $r'_2$. The modeling network 48 preferably corresponds with the dynamics of the secondary process and more specifically to the storage elements to be cancelled in the secondary dynamics $G_s$. The dynamics of the network 48 are shown as represented by $1/G'_{sm}$ and may be referred to as the inverse of the gain and dynamics of the secondary process.

The feedforward signal to modify the manipulated variable is provided through the network 48 essentially to bypass the secondary controller with the control action necessary. Since the results of that control action on the secondary process will be effective to change the value of the secondary controlled variable $c_2$, it is necessary to cancel out the changes in $c_2$ caused by modifying the set point. This is accomplished by the use of the network 54 which receives as an input the signal $r'_2$ and provides as an output a signal $r_2$ representing the set point for the secondary controller. The effect of the network 54 is essentially to delay the set point $r_2$ to have any changes correspond to the expected response of the network $c_2$ so that the changes in $r_2$ cancel out the changes in $c_2$ thus preventing any change from occurring in the error $E_2$ and consequently avoiding any action by the secondary controller. It will thus be evident that with the arrangement of FIG. 3 the primary and secondary controllers are decoupled by the networks 40, 48, and 54 so that regardless of whether the disturbance which occurs is one which affects the secondary process or one which affects the primary process, or merely a change in set points, interaction between the primary and secondary controllers is avoided.

Figure 4:
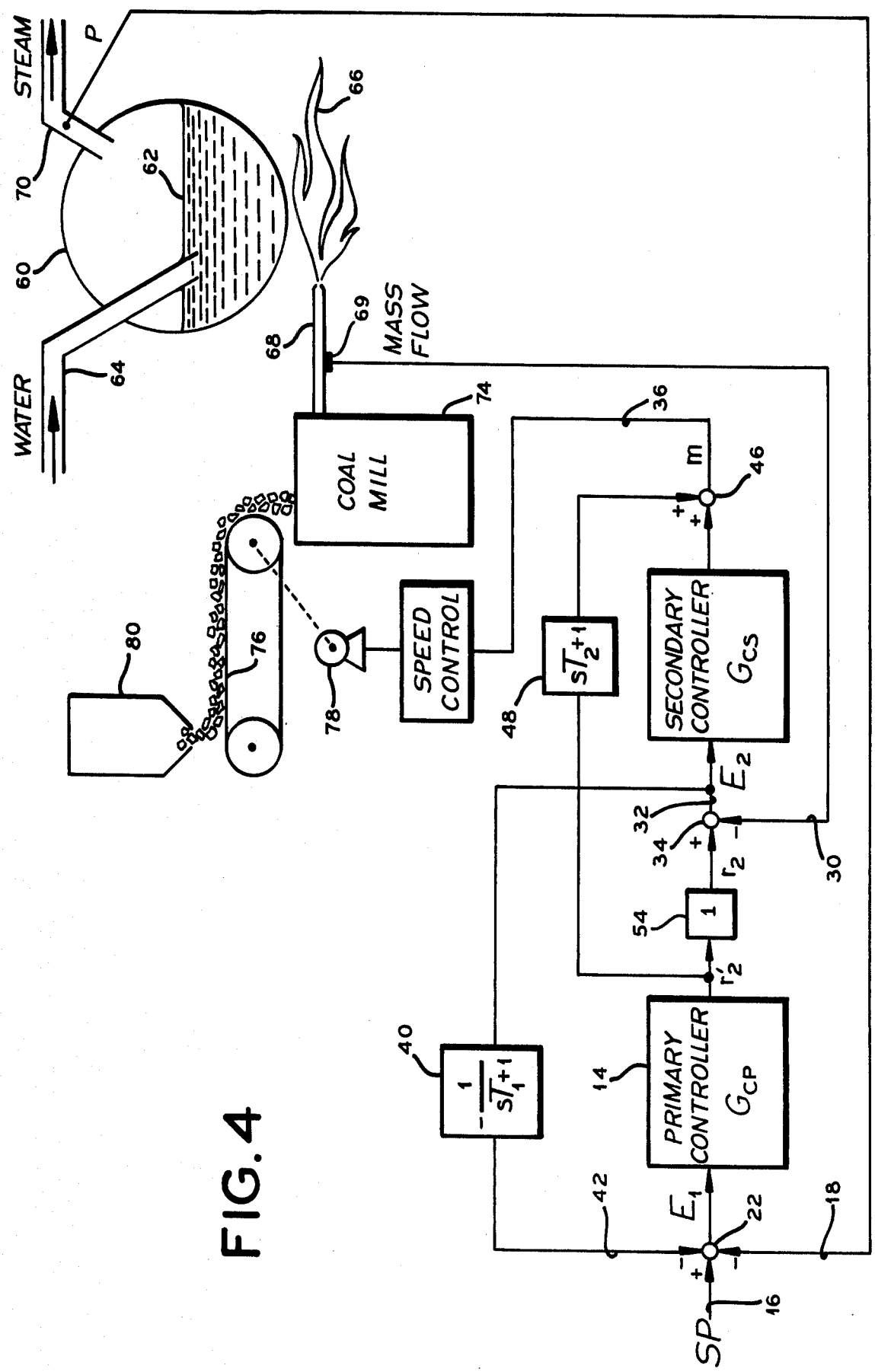
FIG. 4 is a block diagram of a cascade control system of the type shown in FIG. 3 where that system is shown applied to a steam generating process.

The cascade control system with the novel improvements of this invention are shown in FIG. 4 as they may be applied, for example, to the control of fuel flow to a steam generating process.

As shown in FIG. 4, the boiler 60 contains a volume of water 62 as supplied through the pipe 64. That volume of water is heated by the flame 66 produced by burner 68 such as to produce steam from the output line 70. In this particular steam generator it is desired to maintain the pressure in the steam output line 70 at a particular set point SP by modifying the rate at which pulverized coal is supplied to burner 68. The process is controlled, as shown, by a cascade control system of the type previously described in FIG. 3 by using as a secondary controlled variable the mass flow of fuel to the burner 68 as measured by transducer 69. As shown in FIG. 4, the coal is pulverized by mill 74 and is supplied to the coal mill by the conveyor belt 76 whose speed is varied by control of its driving motor 78. The conveyor 76 is provided a constant supply of coal to be crushed by means of the hopper 80. It will be assumed that the hopper 80 is operated to effectively maintain a constant amount of coal on each unit of area of the conveyor belt so that the rate of feed of coal to the coal mill is solely controlled by the speed of the motor 78.

For purposes of illustrating the apparatus of the cascade control system of this invention, it will be assumed that as a first approximation both the coal supply process, namely mill 74, and the boiler 60 may be represented by first order lags. Thus, the network in block 40 will be that required to provide a first order lag as represented by the transform $1/sT_1+1$.

The network which will be required for block 48 is a lead network which can be represented by the transform $sT_2+1$ since that network is an inverse of the model of the secondary process.

As shown in FIG. 3, the network which is required for block 54 is the product of the model of the secondary process and the inverse model which in this case produce unity or, in other words, in the particular arrangement of FIG. 4 there is no delay inserted in the output circuit of the primary controller which produces the set point for the secondary controller and a direct connection can therefore be made which would, of course, have unity gain. If, of course, the secondary process involved some dead time in addition to the assumed lag, the network 54 would take that into account and would delay the signal $r'_2$ so that any changes in the signal $r_2$ would cancel out any signal on line 30 which represents the mass flow of coal to the burner 68.

What is claimed is:

1. In a cascade control system wherein a primary process is controlled by a primary controller responding to a first error signal indicative of the deviation of a primary controlled variable from a first set point to modify a second set point, and a secondary process is controlled by a secondary controller responding to a second error signal indicative of the deviation of a secondary variable from said second set point, the improvement comprising:
   means responsive to said second error signal for modifying said first error signal by an amount sufficient to reduce the effects on said first error signal of changes in said primary variable resulting from disturbances affecting said secondary process.

2. A cascade control system as set forth in claim 1 in which said means includes a model of said primary process.

3. In a cascade control system for controlling the primary variable of a process by controlling a manipulated variable wherein a primary control system responsive to the deviation of the primary controlled variable from a set point produces a first control signal operable to adjust the set point for a secondary control system which is responsive to the deviation of a secondary controlled variable from said last named set point for producing a second control signal for controlling the manipulated variable, the improvement comprising:

means representing a model of said primary process operative in response to the deviation of the secondary controlled variable from its set point to modify the deviation of the primary controlled variable by an amount effective to reduce the changes in said last named deviation resulting from changes in the primary controlled variable due to disturbances affecting the secondary process.

4. A cascade control system as set forth in claim 3 in which the improvement includes:
  means for modifying the manipulated variable in response to the first control signal, said response being in accordance with an inverse model of the dynamics of said secondary process; and
  means for modifying the deviation of the secondary controlled variable from its set point in accordance with the product of said inverse model and a full model of the secondary process.

5. In a cascade control system for controlling the primary variable of a process by controlling a manipulated variable wherein a primary control system responsive to the deviation of the primary controlled variable from a set point produces a first control signal operable to adjust the set point for a secondary control system which is responsive to the deviation of a secondary controlled variable from said last named set point for producing a second control signal for controlling the manipulated variable, the improvement comprising:
  means for modifying the manipulated variable in response to the first control signal, said response being in accordance with an inverse model of the dynamics of said secondary process; and
  means for modifying the deviation of the secondary controlled variable from its set point in accordance with the product of said inverse model and a full model of the secondary process.

* * * * *